(12) United States Patent
Yu (10) Patent No.: US 11,079,629 B2
(45) Date of Patent: Aug. 3, 2021

(54) LED BACKLIGHT MODULE

(71) Applicant: AmTRAN Technology Co., Ltd., New Taipei (TW)

(72) Inventor: Hung-Ta Yu, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 0 days.

(21) Appl. No.: 16/683,281

(22) Filed: Nov. 14, 2019

(65) Prior Publication Data
US 2020/0326595 A1  Oct. 15, 2020

(30) Foreign Application Priority Data
Apr. 10, 2019  (TW) .................................. 108112551

(51) Int. Cl.
| | | |
|---|---|---|
| *G02F 1/13357* | (2006.01) | |
| *F21V 8/00* | (2006.01) | |
| *G02F 1/1335* | (2006.01) | |

(52) U.S. Cl.
CPC ..... *G02F 1/133606* (2013.01); *G02B 6/0051* (2013.01); *G02B 6/0053* (2013.01); *G02B 6/0055* (2013.01); *G02B 6/0088* (2013.01); *G02F 1/133603* (2013.01); *G02F 1/133605* (2013.01); *G02F 1/133607* (2021.01); *G02F 1/133614* (2021.01)

(58) Field of Classification Search
CPC .................................................. G02B 6/0041
See application file for complete search history.

(56) References Cited

U.S. PATENT DOCUMENTS

| | | | | |
|---|---|---|---|---|
| 7,819,539 | B2 | 10/2010 | Kim et al. | |
| 9,653,660 | B1* | 5/2017 | Lin | ...... H01L 23/3185 |
| 10,663,648 | B2* | 5/2020 | Yoo | ...... G02B 6/0088 |
| 2006/0291238 | A1* | 12/2006 | Epstein | ............ G02B 5/0294 |
| | | | | 362/600 |
| 2010/0103681 | A1* | 4/2010 | Kamei | ............ G02B 6/0006 |
| | | | | 362/298 |

(Continued)

FOREIGN PATENT DOCUMENTS

| | | |
|---|---|---|
| CN | 105404054 A | 3/2016 |
| CN | 108384530 A | 8/2018 |

(Continued)

*Primary Examiner* — Jong-Suk Lee
*Assistant Examiner* — Eric T Eide
(74) *Attorney, Agent, or Firm* — CKC & Partners Co., LLC (57) ABSTRACT

A light emitting diode (LED) backlight module includes an LED light source, a quantum dot enhancement film, a diffuser plate, a blue light reflector, and a blue light filter and reflector. The LED light source includes a plurality of blue LEDs formed therein, the quantum dot enhancement film is excited by blue lights emitted by the blue LEDs to emit red lights and green lights, and the diffuser plate is disposed between the LED light source and the quantum dot enhancement film, and the blue light reflector is disposed on one side, opposite to the quantum dot enhancement film, of the diffuser plate to reflect a part of the blue lights reflected by the diffuser plate to the quantum dot enhancement film. In addition, the blue light filter and reflector is disposed between the diffuser plate and the quantum dot enhancement film.

20 Claims, 4 Drawing Sheets

(56) References Cited

U.S. PATENT DOCUMENTS

| | | | |
|---|---|---|---|
| 2010/0285310 A1* | 11/2010 | Izutani | B32B 2367/00 |
| | | | 428/337 |
| 2013/0335677 A1 | 12/2013 | You | |
| 2014/0036203 A1 | 2/2014 | Guillou et al. | |
| 2014/0374786 A1* | 12/2014 | Bierhuizen | H01L 33/005 |
| | | | 257/98 |
| 2015/0185410 A1* | 7/2015 | Song | G02B 6/0018 |
| | | | 349/65 |
| 2015/0301257 A1* | 10/2015 | Choi | F21V 3/049 |
| | | | 362/607 |
| 2016/0154162 A1 | 6/2016 | Cheng et al. | |
| 2016/0291237 A1* | 10/2016 | He | G02B 6/0073 |
| 2017/0022628 A1* | 1/2017 | Breen | G02B 6/0023 |
| 2017/0082794 A1* | 3/2017 | Jeon | G02F 1/1336 |
| 2017/0123128 A1 | 5/2017 | Wu et al. | |
| 2017/0261812 A1 | 9/2017 | Zeng | |
| 2018/0158983 A1* | 6/2018 | Jang | B32B 7/12 |
| 2018/0246377 A1 | 8/2018 | Fan | |
| 2018/0335667 A1* | 11/2018 | Wang | G02B 6/006 |
| 2019/0088186 A1* | 3/2019 | Huang | G02B 6/0021 |
| 2019/0348591 A1* | 11/2019 | Oh | H01L 25/0753 |
| 2019/0377229 A1* | 12/2019 | Song | H01L 33/504 |
| 2020/0117030 A1* | 4/2020 | Lee | G02F 1/1336 |

FOREIGN PATENT DOCUMENTS

| | | |
|---|---|---|
| CN | 108508654 A | 9/2018 |
| JP | 2011258951 A | 12/2011 |
| WO | 2018196348 A1 | 11/2018 |

\* cited by examiner

LED BACKLIGHT MODULE

RELATED APPLICATIONS

This application claims priority to Taiwan Application Serial Number 108112551, filed Apr. 10, 2019, which is herein incorporated by reference.

TECHNICAL FIELD

The present disclosure generally relates to a backlight module. More particularly, the present disclosure relates to a light emitting diode backlight module.

BACKGROUND

With the expanding application of displays, the display devices currently can integrate camera, communication, and display capabilities therein. In addition, the resolutions of the displays are also increasing over time, for example, the Full HD display devices are replaced by 4K display devices, and the 4 k display devices may be further replaced by the 8K display devices.

When the resolutions of the liquid crystal displays (LCD) enter into the 8K era, the liquid crystal displays bring not only higher resolutions but also more realistic pictures to the users. However, if the backlight modules of the display devices cannot support wide color gamut or provide wide range of brightness for high dynamic range imaging (HDR) on the LCD panel, the LCD panel with the improved resolutions can only imperfectly present a flawed scene with unreal colors to the users, rather than authentically present an immersive scene with real colors.

The best performance of the wide color gamut and high-brightness HDR effects presented by the conventional liquid crystal displays are about 100% NTSC color gamut with capability of 1000 nits HDR brightness, which is close to the color television broadcasting standards set by the National Television System Committee (NTSC). However, the color and brightness performance of displays limited to such display effect requirements is still insufficient to provide accurate presentations of high resolution images.

Thus, improving the color gamut and brightness performance of the liquid crystal displays will contribute to accurately display the high resolution images and effectively improve the image qualities of the liquid crystal displays.

SUMMARY

One objective of the embodiments of the present invention is to provide a light emitting diode backlight module to improve the color gamut and brightness performance of the liquid crystal display so as to improve the image quality thereof.

To achieve these and other advantages and in accordance with the objective of the embodiments of the present invention, as the embodiment broadly describes herein, the embodiments of the present invention provides a light emitting diode backlight module including a light emitting diode light source, a quantum dot enhancement film, a diffuser plate, and a blue light reflector. The light emitting diode light source has a plurality of blue light emitting diodes. The quantum dot enhancement film is excited by the blue lights emitted by the blue light emitting diodes so as to emit red lights and green lights. The diffuser plate is disposed between the light emitting diode light source and the quantum dot enhancement film. The blue light reflector is disposed at a side, opposite to the quantum dot enhancement film, of the diffuser plate to reflect a part of the blue lights reflected by the diffuser plate to the quantum dot enhancement film.

In another aspect, a light emitting diode backlight module includes a light emitting diode light source, a quantum dot enhancement film, a diffuser plate, and a blue light filter and reflector. The light emitting diode light source has a plurality of blue light emitting diodes. The quantum dot enhancement film is excited by the blue lights emitted by the blue light emitting diodes so as to emit red lights and green lights. The diffuser plate is disposed between the light emitting diode light source and the quantum dot enhancement film. The blue light filter and reflector is disposed between the diffuser plate and the quantum dot enhancement film to guide the blue lights emitted by the blue light emitting diodes to the quantum dot enhancement film and reflect a part of blue lights reflected by the quantum dot enhancement film to the quantum dot enhancement film again.

In yet another aspect, a light emitting diode backlight module includes a light emitting diode light source, a quantum dot enhancement film, a diffuser plate, a blue light reflector, and a blue light filter and reflector. The light emitting diode light source has a plurality of blue light emitting diodes. The quantum dot enhancement film is excited by the blue lights emitted by the blue light emitting diodes so as to emit red lights and green lights. The diffuser plate is disposed between the light emitting diode light source and the quantum dot enhancement film. The blue light reflector is disposed at a side, opposite to the quantum dot enhancement film, of the diffuser plate to reflect a part of blue lights reflected by the diffuser plate to the quantum dot enhancement film. The blue light filter and reflector is disposed between the diffuser plate and the quantum dot enhancement film to guide the blue lights emitted by the blue light emitting diodes to the quantum dot enhancement film and reflect a part of blue lights reflected by the quantum dot enhancement film to the quantum dot enhancement film again.

In some embodiments, the blue light emitting diodes include a plurality of mini light emitting diodes, e.g. a plurality of molded chip scale package (mCSP) light emitting diodes.

In some embodiments, the light emitting diode backlight module further includes a brightness enhancement film and a diffuser sheet sequentially disposed on a surface of the quantum dot enhancement film.

In some embodiments, the brightness enhancement film includes a first prism sheet and a second prism sheet.

In some embodiments, the light emitting diode backlight module is a direct type light emitting diode backlight module.

In some embodiments, the light emitting diode backlight module is an edge-lit light emitting diode backlight module, and the light emitting diode backlight module further includes a light guide plate disposed on a surface, opposite to the quantum dot enhancement film, of the diffuser plate.

In some embodiments, the light emitting diode backlight module further includes a light guide plate disposed between the diffuser plate and the blue light reflector.

In some embodiments, the blue light reflector includes a polyester base and a TiO2 film.

In some embodiments, the polyester base is a 0.188 mm polyethylene terephthalate (PET) film and a thickness of the TiO2 film is about 100 nm.

In some embodiments, the blue light filter and reflector is a polyester base and an Azo compound dye film.

In some embodiments, a surface, close to the quantum dot enhancement film, of the blue light filter and reflector is blue, and a surface, close to the diffuser plate, of the blue light filter and reflector is yellow.

In some embodiments, the blue light wavelength of the blue light emitting diodes is about 430 nm~480 nm.

Hence, the light emitting diode backlight module can effectively improve the utilization of the blue lights and excite the quantum dot enhancement film with blue lights having wavelengths within a predetermined range to emit desired white lights, which improves the spectrum characteristics of the red lights and green lights emitted by the quantum dot enhancement film and further enhances the luminous efficiency, brightness and color gamut performance of the light emitting diode backlight module.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present disclosure. This description is not to be taken in a limiting sense but is made merely for the purpose of describing the general principles of the invention. The scope of the invention should be determined by referencing the appended claims.

Figure 1:
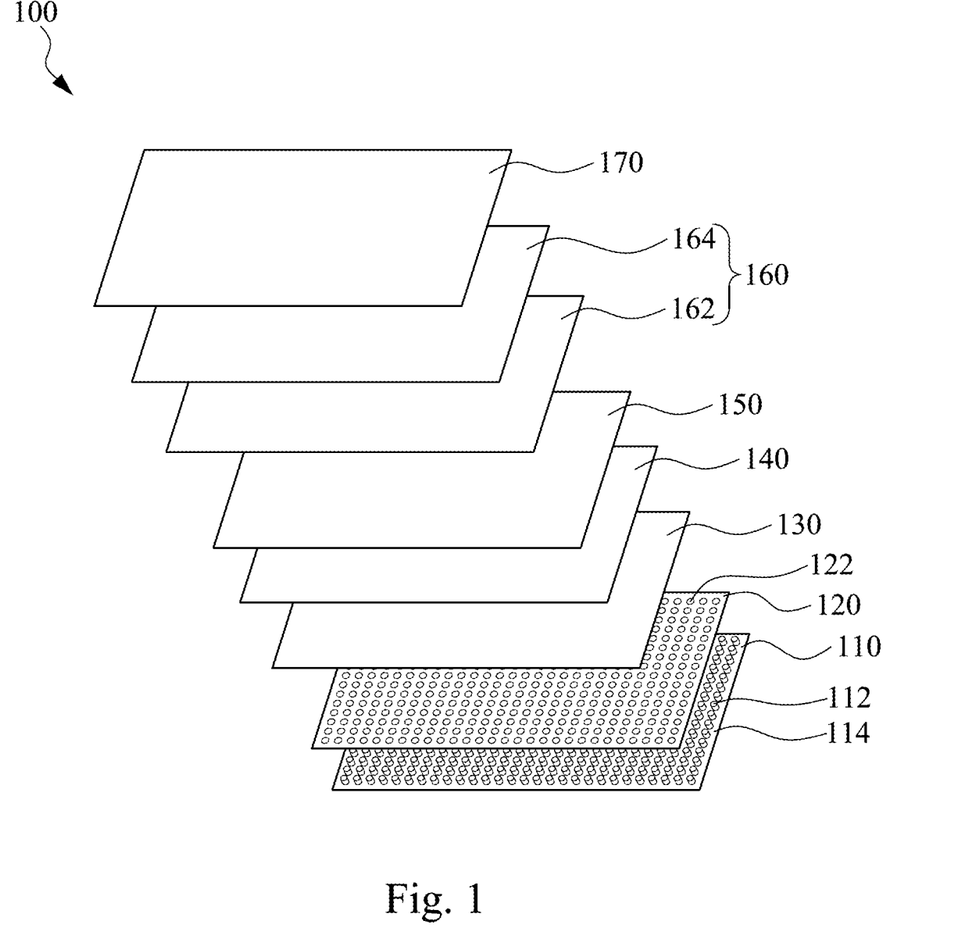
FIG. 1 illustrates a schematic diagram showing a light emitting diode backlight module according to one embodiment of the present invention.
Figure 2:
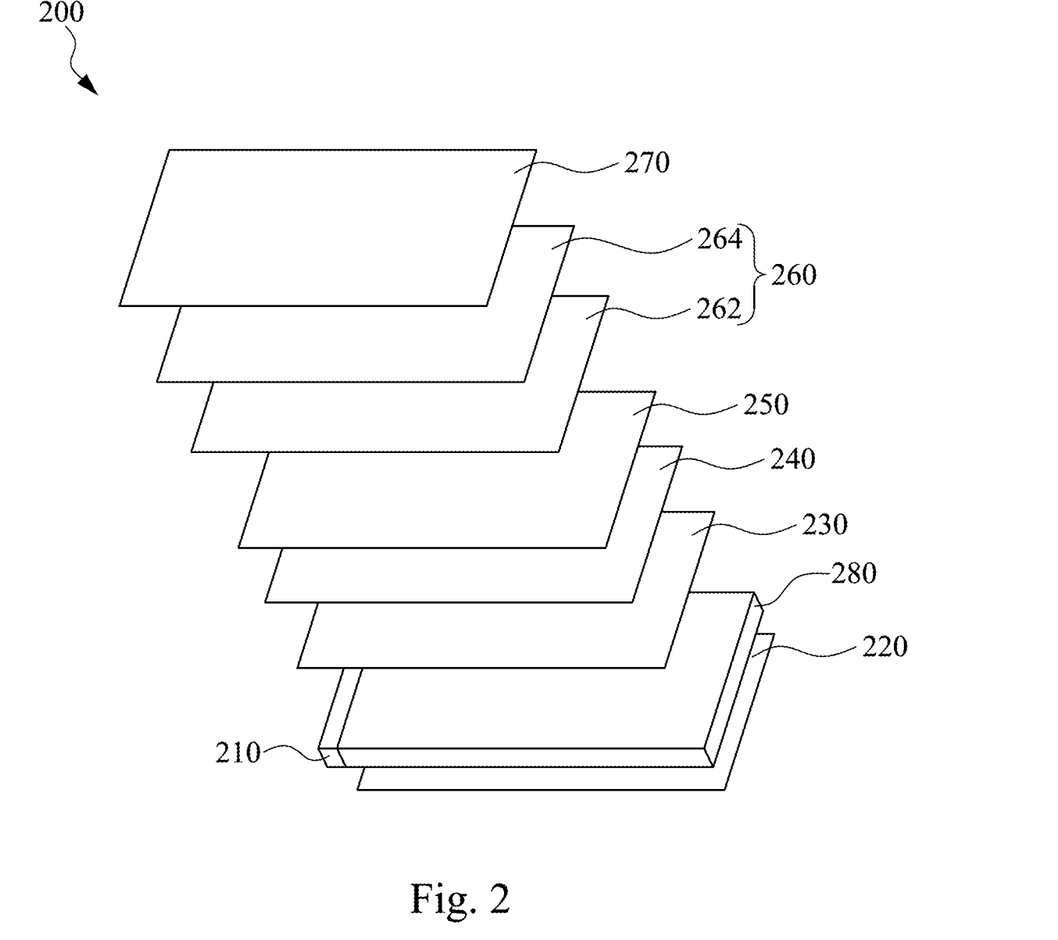
FIG. 2 illustrates a schematic diagram showing a light emitting diode backlight module according to another embodiment of the present invention.
Figure 3:
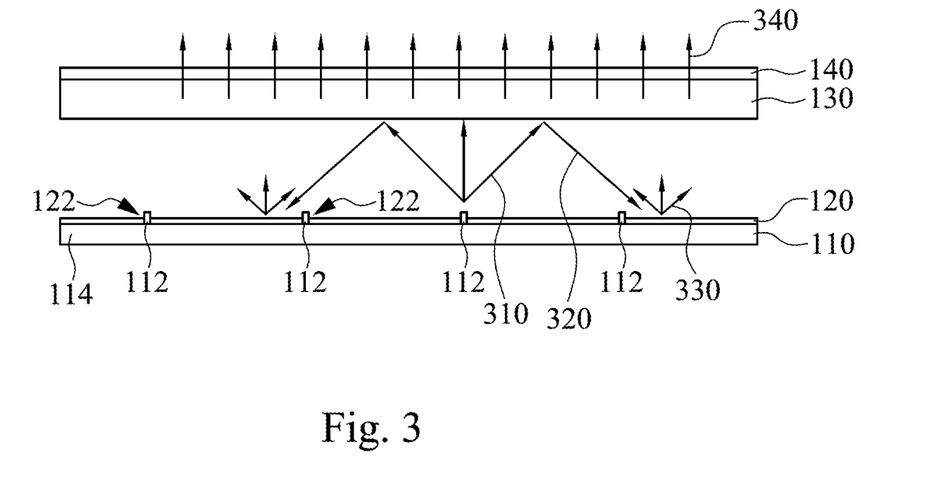
FIG. 3 illustrates a schematic diagram showing a part of light paths of the light emitting diode backlight module according to one embodiment of the present invention.
Figure 4:
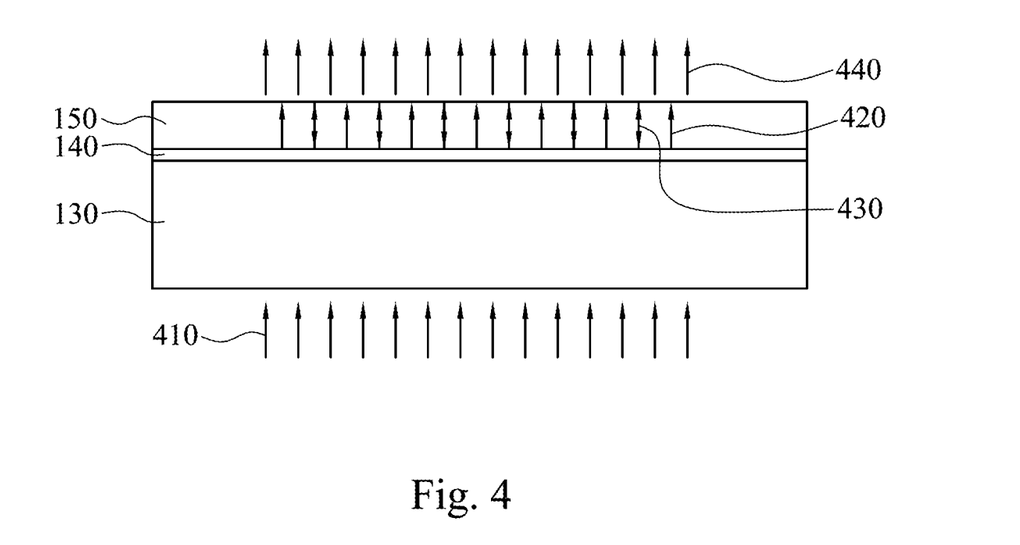
FIG. 4 illustrates a schematic diagram showing another part of light paths of the light emitting diode backlight module according to one embodiment of the present invention.
Figure 5:
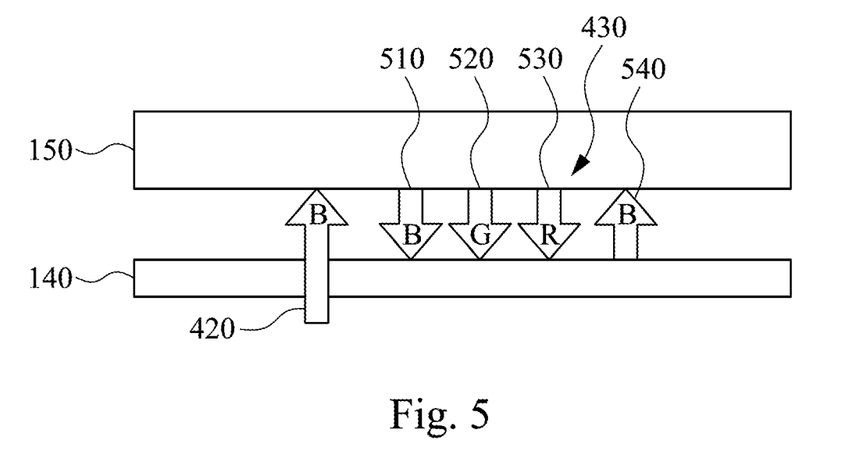
FIG. 5 illustrates an enlarged diagram of the light paths of FIG. 4.
Figure 6:
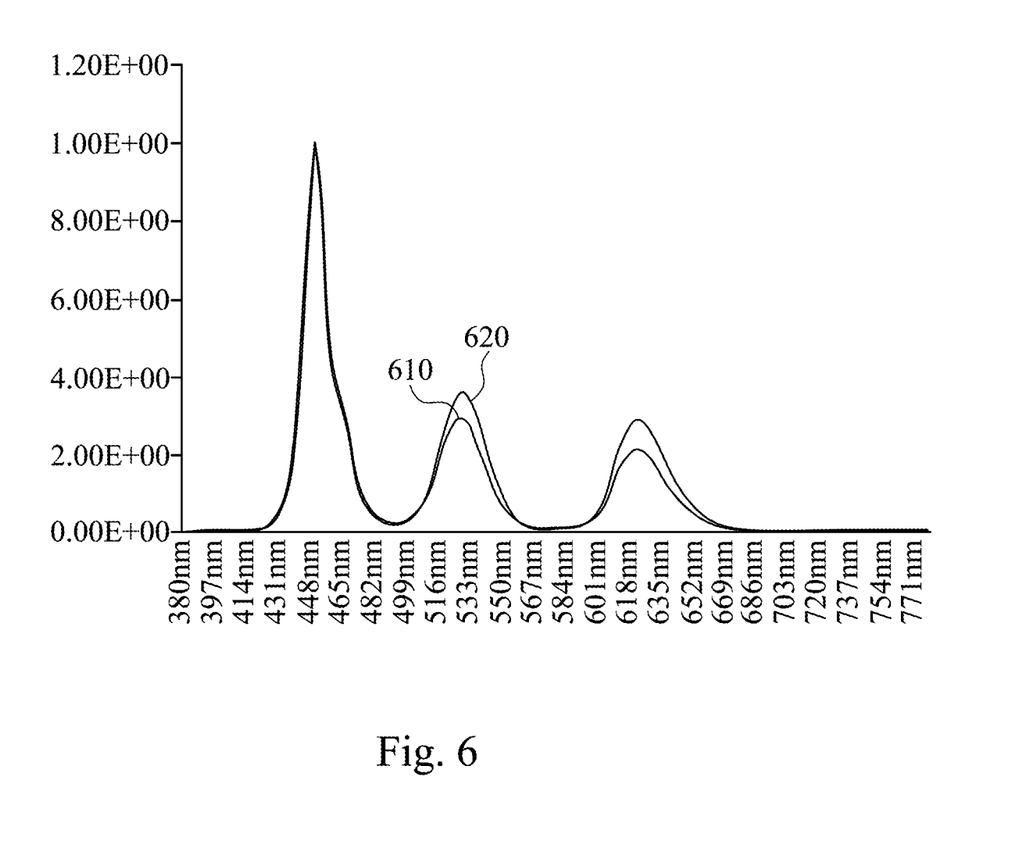
FIG. 6 illustrates a spectrum comparison diagram of a conventional light emitting diode backlight module and the light emitting diode backlight module according to one embodiment of the present invention.

FIG. 1 illustrates a direct type light emitting diode backlight module. FIG. 2 illustrates an edge-lit light emitting diode backlight module. FIG. 3 illustrates a part of light paths of the light emitting diode backlight module, FIG. 4 illustrates another part of light paths of the light emitting diode backlight module, and FIG. 5 illustrates an enlarged diagram of the light paths of FIG. 4. FIG. 6 illustrates a spectrum comparison diagram of a conventional light emitting diode backlight module and the light emitting diode backlight module according to one embodiment of the present invention.

As illustrated in FIG. 1, a light emitting diode backlight module 100, which is a direct type backlight module, includes a light emitting diode light source 110, a quantum dot enhancement film 150, a blue light filter and reflector 140, a diffuser plate 130 and a blue light reflector 120. The light emitting diode light source 110 includes a plurality of blue light emitting diodes 112 disposed on a circuit board 114. The quantum dot enhancement film 150 is configured to receive the blue lights emitted by the blue light emitting diodes 112, which excite the quantum dot material within the quantum dot enhancement film 150 to emit the red lights and the green lights. The diffuser plate 130 is disposed between the light emitting diode light source 110 and the quantum dot enhancement film 150.

The blue light reflector 120 can be a partially transparent blue light reflective film, which is capable of partially transmitting the blue lights, or an opaque blue light reflecting sheet, which completely reflects the blue lights. The blue light reflector 120 is disposed on one side of the diffuser plate 130, which is opposite to the quantum dot enhancement film 150, so a part of the blue lights reflected by the diffuser plate 130 can be reflected back to the quantum dot enhancement film 150.

Simultaneously referring to FIG. 3, the blue light reflector 120 further includes a plurality of opening 122. The blue light emitting diodes 112 are exposed by the openings 122 when the blue light reflector 120 covers on the circuit board 114, so the blue lights 310 radiate toward the diffuser plate 130 when the blue lights are emitted by the blue light emitting diodes 112.

Part of the first-order blue lights 310 transmitted from the blue light emitting diodes 112 may be reflected by the diffuser plate 130, i.e. the first-order reflected lights 320. The first-order reflected lights 320 return to the blue light reflector 120 covering the circuit board 114, which reflect the lights 320 again. Thus, the blue light utilization efficiency is improved. The blue light reflector 120 may be designed as to reflect the blue lights having predetermined wavelengths. In some embodiments, the blue light reflector 120 reflects the blue lights having wavelengths within 420 nm to 480 nm.

In some embodiments, the blue light emitting diodes 112 includes a plurality of mini light emitting diodes (Mini LEDs), and the Mini LEDs can be molded chip scale package (mCSP) Mini LEDs.

Part of the first-order blue lights 310 transmitted from the blue light emitting diodes 112 may pass through the diffuser plate 130 as well as the second-order blue lights 330, which is the lights reflected by the blue light reflector 120 covered on the circuit board 114, and eventually excite the quantum dot material within the quantum dot enhancement film 150 to emit the white light. The blue lights having the predetermined wavelengths may pass through the blue light filter and reflector 140 and form the blue lights 340 for exciting the quantum dot material within the quantum dot enhancement film 150 so as to emit the green lights with 530 nm~540 nm wavelengths and the red lights with 630 nm~640 nm wavelengths.

However, while most of the first-order blue lights and the second-order blue lights pass through the blue light filter and reflector 140, a part of the blue lights may be still reflected by the quantum dot enhancement film 150 such that the reflected blue lights cannot be converted into the red lights and the green lights. Simultaneously referring to FIG. 1 and FIG. 4, the light emitting diode backlight module 100 may further includes a blue light filter and reflector 140 disposed on a surface of the diffuser plate 130 and located between the diffuser plate 130 and the quantum dot enhancement film 150, such that the blue lights 410, which are emitted by the blue light emitting diodes 112 and pass through the diffuser plate 130, are guided to the quantum dot enhancement film 150 with the blue light filter and reflector 140. Most of the blue lights 420 will directly enter into the quantum dot enhancement film 150 to excite the quantum dot material within the quantum dot enhancement film 150, and a part of the light 430 may be reflected by the quantum dot enhancement film 150, However, the part of the light 430 reflected by the quantum dot enhancement film 150 will be reflected by the blue light filter and reflector 140 and guided to enter into the quantum dot enhancement film 150 again.

Therefore, the blue light filter and reflector 140 can reflect the lights 430, which are reflected by the quantum dot enhancement film 150, back to the quantum dot enhancement film 150 and excite more red lights and green lights to be emitted. Thus, the desired white lights 440 will be provided.

Further referring to FIG. 5, because the refractive indexes of the materials are different, a part of the white lights emitted by the quantum dot enhancement film 150 may be reflected back to the blue light filter and reflector 140. The white lights can be separated into the reflected blue lights 510, the reflected green lights 520 and the reflected red lights 530. The reflected green lights 520 and the reflected red lights 530 can be absorbed by the dyes or coating of the blue light filter and reflector 140 and the reflected blue lights 510 can be reflected back as the blue lights 540. Thus, more blue lights are provided to excite the quantum dot material within the quantum dot enhancement film 150, and more white lights are emitted. The brightness and efficiency of the light emitting diode backlight module 100 are therefore improved.

In some embodiments, with the foregoing three chances that the blue lights could be reflected to the quantum dot enhancement film, the light emitting diode backlight module 100 could provide more blue lights to excite more red lights and green lights and the brightness of the light emitting diode backlight module 100 is further improved about 7%~10%.

In addition, the brightness of the light emitting diode backlight module 100 can be improved with the blue light reflector 120 and/or the blue light filter and reflector 140, alone or in combination, which do not depart from the spirit and scope of the present invention.

In some embodiments, a blue light reflector 120 configured to reflect the blue lights with the predetermined wavelengths, such as 420 nm~480 nm, is formed on the surface of the circuit board 114 having the light emitting diode light source 110 disposed. The blue light reflector 120 is configured to reflect the blue lights with the predetermined wavelengths to the diffuser plate 130. The lights emitted by the blue light emitting diodes 112 transmit toward to the diffuser plate 130 and the second-order lights reflected by the blue light reflector 120 also radiate to the diffuser plate 130, and a part of the lights will then pass through the diffuser plate 130 and the blue light filter and reflector 140 and excite the quantum dot enhancement film 150 to emit the white lights. However, the remaining part of the lights transmitted toward to the diffuser plate 130 may not pass through the diffuser plate 130, and be reflected back to the optical chamber within the backlight module 100. Such reflected lights will be reflected again with the blue light reflector 120 and the utilization efficiency of the blue lights is therefore improved.

In some embodiments, the package size of the mCSP mini-LED utilized as the blue light emitting diode is smaller than 600 μm (micrometer). The mCSP mini-LED has a material layer or structure, such as TiO2, covering the top portion of the light-emitting diode to change the light intensity distributions of the emitted lights. Since the highly reflective material layer or structure is directly formed above the light-emitting diode so as to redistribute the light patterns of emitted lights from the light-emitting diode, the redistributed light patterns of the light-emitting diode may be similar to the light patterns of emitted lights from the light emitting diode through a secondary optical lens.

In some embodiments, the light emitted by the mCSP mini-LED is blue light, wherein the wavelength of the blue light is between 430 nm and 480 nm. For example, the blue light with wavelength between 435 nm and 460 nm can be utilized to improve the efficiency and brightness of the lights emitted by the light emitting diode backlight module 100, such that the color gamut will be effectively improved and meet the HDR brightness requirements as NTSC 110% and 2000 nits.

In some embodiments, the blue light reflector 120 on the circuit board 114 can reflect the blue lights in reverse direction, including the blue lights reflected by the reflective material on the top of the light emitting diodes and the blue lights reflected by the diffuser plate 130, back to the diffuser plate 130 and improve the utilization of the blue lights. The blue light reflector 120 can be designed as to only reflect the blue lights with 420 nm to 480 nm wavelength.

With the aforementioned three blue light reflection structures, the light emitting diode backlight module 100 can provide more blue lights to excite more red lights and green lights, and the brightness can be improved about 7% to 10%.

In some embodiments, the blue light filter and reflector 140 works as a filter of blue lights with a predetermined wavelength, e.g. the blue lights with 420 nm to 480 nm wavelength. The blue light filter and reflector 140 ensures that only the blue lights within the predetermined wavelength range can pass through and excite the quantum dot enhancement film 150, which enhances the color gamut performance thereof by utilizing only the blue lights within the predetermined wavelength range. Part of the blue lights passing through the blue light filter and reflector 140 may excite the quantum dot enhancement film 150 to emit the white lights and other part of the blue lights may be reflected by the quantum dot enhancement film 150, and the blue light filter and reflector 140 may reflect the reflected blue lights back to excite the quantum dot enhancement film 150, so more white lights can be emitted and the utilization of second-order blue lights can be further improved.

In some embodiments, the surface of the blue light filter and reflector 140 closed to the quantum dot enhancement film 150 is blue, and the surface of the blue light filter and reflector 140 closed to the diffuser plate 130 is yellow. That is to say, the surface where the lights exit the blue light filter and reflector 140 is blue and the surface where the lights enter the blue light filter and reflector 140 is yellow.

With referring to FIG. 6, curve 610 is the spectrum curve of a conventional light emitting diode backlight module and curve 620 is the spectrum curve of the light emitting diode backlight module according to one embodiment of the present invention.

While both of the spectrum curves 610 and 620 have the same peak value of the blue lights with 451 nm wavelength, the spectrum curve 620 can provide higher peak value of red lights and green lights which are mixed with the blue lights to produce white lights. Thus, more white lights can be emitted by the quantum dot enhancement film 150 according to one embodiment of the present invention, which is excited by the blue lights from the light emitting diode backlight module. Therefore, the properties of the full width at half maximum (FWHM) are improved, i.e., a narrower full width at half maximum, higher luminous efficiency and better color gamut can be achieved.

The foregoing improved blue light utilization can effectively improve the efficiency of the quantum dot enhancement film 150 about 7% so as to increase the brightness of the light emitting diode backlight module 100. In addition, restricting the reflected blue lights within the predetermined wavelength range can improve the performance of color gamut. The predetermined wavelength range of the blue lights can excite the quantum dots to provide spectrums with narrower FWHM performance, and the narrower FWHM contributes to the improvement of the color gamut. Therefore, the backlight module of the present invention can concentrate the emitted blue lights within the predetermined wavelength range, which simultaneously improves the FWHM of the emitted lights and the luminous efficiency of the backlight module.

In some embodiments, the blue light reflector 120 attached on the circuit board 114 can include a polyester base and a TiO2 film evaporated on the polyester base. The thickness of the TiO2 film may be adjusted to a predetermined dimension in order to conduct different reflection effects for predetermined wavelength ranges. For example, the polyester base can be a 0.188 mm polyethylene terephthalate (PET) film and the thickness of the TiO2 film on the base can be about 100 nm. The thicknesses of the films can be adjusted to achieve the reflective index as about 0.4~0.47 for the blue lights with wavelengths in 420 nm~480 nm, and the reflective indexes for the red lights and green lights with wavelengths in 530 nm~630 nm can be simultaneously adjusted to about 0.1~0.14, so the light emitting diode backlight module 100 can be improved to provide higher reflective index for the blue lights within the light emitting diode backlight module 100 so as to achieve higher light utilization efficiency.

In addition, the refractive indexes of the optical films and air gaps are different, wherein the air gaps exist between the optical films and in the space of light emitting diode backlight module 100. For example, the refractive index of the quantum dot enhancement film 150 is about 1.58, and the refractive index of the air is about 1. When the blue lights 420 hit the quantum dot enhancement film 150 through the air, a part of the white lights emitted by the quantum dot enhancement film 150 that is excited by the blue lights 420 may be refracted due to the difference of the refractive indexes therebetween. The refracted white lights may be decomposed into the red reflected lights 530, the green reflected lights 520 and the blue reflected lights 510. The blue reflected lights 510 may also include a part of the blue lights 420, which is reflected by the quantum dot enhancement film 150 when hitting the quantum dot enhancement film 150. The blue reflected lights 510, the red reflected lights 530, and the green reflected lights 520 may be absorbed or reflected by the azo compound formed on the light exit surface of the blue light filter and reflector 140, such that the blue lights 540 will be reflected toward the quantum dot enhancement film 150 again and thus the utilization efficiency of the blue lights is further improved.

In some embodiments, the light emitting diode backlight module 100 further includes at least one brightness enhancement film 160 and a diffuser sheet 170 sequentially disposed on a surface of the quantum dot enhancement film 150. The brightness enhancement film 160 includes a first prism sheet 162 and a second prism sheet 164.

In an embodiment of the present invention, a light emitting diode backlight module 200, e.g. an edge-lit light emitting diode backlight module, includes a light guide plate 280, a light emitting diode light source 210 disposed on one side of the light guide plate 280, a blue light reflector 220 disposed under the light guide plate 280, a diffuser plate 230 disposed above the light guide plate 280 and a quantum dot enhancement film 250 disposed above the diffuser plate 230 as shown in FIG. 2. In other words, the light guide plate 280 is disposed between the diffuser plate 230 and the blue light reflector 220 in order to effectively improve the utilization of blue lights. The blue light reflector 220 has no openings 122 as formed on the blue light reflector 120 for exposing the light sources and is configured to reflect the blue lights.

In addition, the light emitting diode backlight module 200 further includes a blue light filter and reflector 240 disposed between the diffuser plate 230 and the quantum dot enhancement film 250, a brightness enhancement film 260 disposed above the quantum dot enhancement film 250, and a diffuser sheet 270 disposed above the brightness enhancement film 260 as shown in FIG. 2, so the utilization efficiency of blue lights in the light emitting diode backlight module 200 is improved. The brightness enhancement film 260 may include a first prism sheet 262 and a second prism sheet 264.

In some embodiments, the light emitting diode backlight module 200 may be equipped with the blue light filter and reflector 240 without a blue light reflector 220, and the blue light utilization efficiency of blue lights is still improved. That is to say, the light guide plate 280 may be disposed on a surface, opposite to the quantum dot enhancement film 250, of the diffuser plate 230, and the blue light filter and reflector 240 is disposed between the quantum dot enhancement film 250 and the diffuser plate 230. In addition, the dimensions and material of the optical films of the light emitting diode backlight module 200 can refer to the dimensions and material of the optical films of the foregoing light emitting diode backlight module 100.

In some embodiments, the diffuser sheet 170 can be a dual brightness enhancement film (DBEF) and the thickness thereof is about 0.3 mm to 0.5 mm, e.g. approximate 0.315 mm. The brightness enhancement film 160 may have two prism sheets or brightness enhancement films (BEFs) with the thickness 0.235 mm~0.285 mm, e.g. approximate 0.285 mm. In addition, the thickness of the quantum dot enhancement film 150 is about 0.23 mm~0.35 mm, e.g. approximate 0.23 mm. The thickness of the blue light filter and reflector 140 is about 0.1 mm~0.2 mm, e.g. approximate 0.15 mm. The thickness of the diffuser plate 130 is about 1.0 mm~2.5 mm, e.g. approximate 2.0 mm. The thickness of the blue light reflector 120 is about 0.188 mm~0.225 mm, e.g. approximate 0.2 mm.

Accordingly, the light emitting diode backlight module can effectively improve the utilization of the blue lights and excite the quantum dot enhancement film with blue lights having wavelengths within a predetermined range to emit desired white lights, which improves the characteristics of FWHM of the red lights and green lights emitted by the quantum dot enhancement film and further enhances the luminous efficiency, brightness and color gamut performance of the light emitting diode backlight module.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A light emitting diode backlight module, comprising:
   a light emitting diode light source, the light emitting diode light source having a plurality of blue light emitting diodes;
   a quantum dot enhancement film, wherein the quantum dot enhancement film is configured to be excited by blue lights emitted by the blue light emitting diodes and emit red lights and green lights;
   a diffuser plate disposed between the light emitting diode light source and the quantum dot enhancement film;
   a blue light reflector disposed at a side, opposite to the quantum dot enhancement film, of the diffuser plate to reflect a part of blue lights reflected by the diffuser plate toward the quantum dot enhancement film;
   a brightness enhancement film and a diffuser sheet sequentially disposed on a surface of the quantum dot enhancement film; and
   a blue light filter and reflector disposed between the diffuser plate and the quantum dot enhancement film, wherein the blue light filter and reflector has a blue surface close to the quantum dot enhancement film and a non-blue surface close to the diffuser plate.

2. The light emitting diode backlight module of claim 1, wherein the blue light emitting diodes comprise a plurality of molded chip scale package (mCSP) light emitting diodes.

3. The light emitting diode backlight module of claim 1, wherein the brightness enhancement film comprises a first prism sheet and a second prism sheet.

4. The light emitting diode backlight module of claim 1, wherein the light emitting diode backlight module is a direct type light emitting diode backlight module.

5. The light emitting diode backlight module of claim 1, wherein the light emitting diode backlight module is an edge-lit light emitting diode backlight module.

6. The light emitting diode backlight module of claim 5, further comprising a light guide plate disposed on a surface, opposite to the quantum dot enhancement film, of the diffuser plate.

7. The light emitting diode backlight module of claim 1, further comprising a light guide plate disposed between the diffuser plate and the blue light reflector.

8. The light emitting diode backlight module of claim 1, wherein the blue light reflector comprises a polyester base and a TiO2 film.

9. The light emitting diode backlight module of claim 8, wherein the polyester base is a 0.188 mm polyethylene terephthalate (PET) film and a thickness of the TiO2 film is about 100 nm.

10. The light emitting diode backlight module of claim 1, wherein blue light wavelength of the blue light emitting diodes is about 430 nm~480 nm.

11. A light emitting diode backlight module, comprising:
    a light emitting diode light source, the light emitting diode light source having a plurality of blue light emitting diodes;
    a quantum dot enhancement film, wherein the quantum dot enhancement film is configured to be excited by blue lights emitted by the blue light emitting diodes and emit red lights and green lights;
    a diffuser plate disposed between the light emitting diode light source and the quantum dot enhancement film; and
    a blue light filter and reflector disposed between the diffuser plate and the quantum dot enhancement film to guide the blue lights emitted by the blue light emitting diodes toward the quantum dot enhancement film and reflect a part of blue lights reflected by the quantum dot enhancement film toward the quantum dot enhancement film again, wherein a first surface, close to the quantum dot enhancement film, of the blue light filter and reflector is blue, and a second surface, close to the diffuser plate, of the blue light filter and reflector is not blue.

12. The light emitting diode backlight module of claim 11, wherein the blue light emitting diodes comprise a plurality of molded chip scale package (mCSP) light emitting diodes.

13. The light emitting diode backlight module of claim 11, further comprising a brightness enhancement film and a diffuser sheet sequentially disposed on a surface of the quantum dot enhancement film, and the brightness enhancement film comprises a first prism sheet and a second prism sheet.

14. The light emitting diode backlight module of claim 11, wherein the light emitting diode backlight module is a direct type light emitting diode backlight module or an edge-lit light emitting diode backlight module.

15. The light emitting diode backlight module of claim 11, wherein the blue light filter and reflector is a polyester base and an Azo compound dye film and the second surface, close to the diffuser plate, of the blue light filter and reflector is yellow.

16. A light emitting diode backlight module, comprising:
    a light emitting diode light source, the light emitting diode light source having a plurality of blue light emitting diodes;
    a quantum dot enhancement film, wherein the quantum dot enhancement film is configured to be excited by blue lights emitted by the blue light emitting diodes and emit red lights and green lights;
    a diffuser plate disposed between the light emitting diode light source and the quantum dot enhancement film;
    a blue light reflector disposed at a side, opposite to the quantum dot enhancement film, of the diffuser plate to reflect a part of blue lights reflected by the diffuser plate toward the quantum dot enhancement film; and
    a blue light filter and reflector disposed between the diffuser plate and the quantum dot enhancement film to guide the blue lights emitted by the blue light emitting diodes toward the quantum dot enhancement film and reflect a part of blue lights reflected by the quantum dot enhancement film toward the quantum dot enhancement film again, wherein the blue light filter and reflector is a polyester base and an Azo compound dye film.

17. The light emitting diode backlight module of claim 16, wherein the blue light emitting diodes comprise a plurality of molded chip scale package (mCSP) light emitting diodes.

18. The light emitting diode backlight module of claim 16, wherein the blue light reflector comprises a polyester base and a TiO2 film, the polyester base is a 0.188 mm polyethylene terephthalate (PET) film and a thickness of the TiO2 film is about 100 nm, and a surface, close to the quantum dot enhancement film, of the blue light filter and reflector is blue, and a surface, close to the diffuser plate, of the blue light filter and reflector is yellow.

19. The light emitting diode backlight module of claim 1, wherein the diffuser sheet comprises a dual brightness enhancement film (DBEF).

20. The light emitting diode backlight module of claim 1, wherein the brightness enhancement film comprises two prism sheets or brightness enhancement films (BEFs).

* * * * *